Oct. 13, 1970   R. POUPIN   3,534,225
DEVICE FOR CONTROLLING A MACHINE COMPONENT
OVER A RANGE OF SPEEDS OF A MOVING SYSTEM
Filed April 18, 1967   3 Sheets-Sheet 1

INVENTOR
Raymond Poupin
By
Sparrow and Sparrow
ATTORNEYS

# United States Patent Office 3,534,225
Patented Oct. 13, 1970

3,534,225
DEVICE FOR CONTROLLING A MACHINE COMPONENT OVER A RANGE OF SPEEDS OF A MOVING SYSTEM
Raymond Poupin, Fleury-les-Aubrais, France, assignor to Service d'Exploitation Industrielle des Tabacs et des Allumettes, Paris, France, a French public establishment
Filed Apr. 18, 1967, Ser. No. 631,802
Claims priority, application France, Apr. 21, 1966, 58,489
Int. Cl. H02p 5/00
U.S. Cl. 317—5                          4 Claims

ABSTRACT OF THE DISCLOSURE

Device for controlling a machine component during a variation in speed of a moving system comprising a shaft rotating at a speed which is a function of the speed of said moving system, a passage detector delivering at least one pulse once per revolution of said shaft, and at least one threshold detector which is set to trip as a result of the application of pulses having a given amplitude corresponding to a predetermined speed of said moving system and which is energized by said passage detector for controlling said machine component.

---

The present invention relates to a device for controlling a machine component during the acceleration or deceleration of a moving system.

More specifically, the invention is concerned with a device for controlling a component as a function of the speed of a machine during a portion of the time of acceleration or deceleration of said machine. This invention also applies to the case of operation of a component which must be maintained in service after having been controlled under the conditions mentioned above, either during a certain time after the machine has attained normal running speed or after the machine has been brought to a standstill.

This invention can accordingly be employed in the case of deceleration, for the purpose of putting a component into service as soon as the machine attains a speed $V_1$ starting from a normal operating speed $V_0$ and until the machine rotates at a speed $V_2$ which may be zero. The invention can also be carried into effect for the purpose of maintaining the component in service after the machine has been brought to a standstill and for a period of time which can be varied.

In the case of acceleration, the invention can be carried into effect for the purpose of putting a component into service as soon as the machine is started-up or as soon as this latter attains the speed $V_1$ during acceleration and for a period of time which ends when the machine attains a speed $V_2$. The end of said time interval can correspond to the moment at which the normal running speed $V_0$ is attained or to any moment thereafter.

The present invention can be carried into practice in any automatic machine for the purpose, for example, of establishing conditions of automatic restarting of the machine from standstill.

Thus, in the case of a cigarette-making machine in which a continuous rod of cut tobacco is cut to the requisite length to form cigarettes, automatic restarting of a machine is governed, so far as pasting of the cigarette paper is concerned, by the following factors:

The disc which applies the paste or adhesive to the paper wrapping strip must be cleaned after opening the circuit which stops the main motor of the machine and therefore while the machine is in process of slowing down.

The above-mentioned cleaning operation must be performed at the end of the deceleration in order to prevent an unsealed cigarette rod from penetrating into the cutting section and intermediate units from which the rod cannot readily be extracted; in any case, the unsealed rod would prevent automatic restarting of the machine.

Accordingly, the action of the cleaning scraper can be initiated by a timing device with a sufficient time-delay to reduce to the requisite value the length of rod which has not been sealed. However, this method can be employed successfully only if the deceleration of the general control unit remains fairly constant in time in order to ensure that the variations in length of the rod formed during operation of the scraper are not greater than the distance existing in the machine between the pasting disc and the units into which the unsealed tobacco rod must not pass. In actual fact, it has been proved by experience that this deceleration can vary to an appreciable extent as a function of different factors, and primarily those factors which have a direct influence on the value of the coefficient of friction of frictional components of the braking mechanism of the machine.

Under these conditions, the above method is of no practical interest despite the relative ease with which it can be applied.

It may prove feasible to achieve the conditions laid down by making use of centrifugal switches. However, switches of this type are not well suited to the detection of a speed below $V_0/3$ ($V_0$=normal running speed of the machine). Moreover, such switches often prove difficult to adjust.

The device according to the invention makes it possible to satisfy conditions of detection of lower speeds.

The present invention is concerned with a device for controlling a machine component during acceleration or deceleration of a moving system, said device being capable of detecting at least one given speed over a wide range of speeds, wherein a threshold detector which is set to trip as a result of application of pulses of predetermined amplitude corresponding to one speed of the moving system is energized for actuating the component by a motion detector which delivers at least one pulse per revolution of a shaft rotating at a speed which is a function of the speed of said moving system.

The control action which is initiated by the passage of the initial pulse through the threshold detector can be transmitted by an associated capacitor to a self-energizing relay; said capacitor can be chosen so as to stop the operation of the component either before the machine comes to a standstill, or at standstill, or at a given moment thereafter. It is apparent that the function of said relay could also be performed by transistorized logic circuits.

The same expedients can be adopted for the purpose of interrupting the action of the machine component in the case of acceleration, either during said acceleration or when the normal running speed is attained, or finally at the end of a given time of operation at normal speed.

However, should it prove necessary to obtain a higher degree of precision, preference will accordingly be given in the cases last mentioned to the use of a system comprising a circuit which performs a series of logic functions and to which will be applied the amplified and shaped pulses delivered by two threshold detectors which are set to trip as a result of application of pulses having predetermined amplitudes corresponding to two speeds of the moving system in process of deceleration, said logic circuit being intended to initiate successively the starting and stopping of the machine component.

Similarly, use will be made of a suitable logic circuit to which amplified and shaped pulses will be applied on the one hand directly from the proximity detector and on the other hand from the threshold detector and which will control the machine component during acceleration of the moving system, or as soon as said moving system has been started-up and up to the desired speed during the time of operation of a timing device.

By employing a combination of the expedients outlined above for the purpose of controlling then stopping the machine component during acceleration of the moving system, there can similarly be employed a suitable logic circuit to which amplified and shaped pulses will be applied on the one hand directly from the proximity detector and on the other hand from two threshold detectors which are set to trip as a result of the application of pulses having predetermined amplitudes corresponding to two speeds of the moving system in process of acceleration.

The description which now follows below in reference to the accompanying drawings constitutes one example of application of the invention to a cigarette-making machine and more especially to the control of the paste scraper in accordance with French Pat. No. 21,072 filed on June 16, 1965. It will be readily understood that the use of the device which is contemplated by this invention extends to all fields and that the description of said device which is given hereinafter is not intended to imply any limitation.

Figure 4:
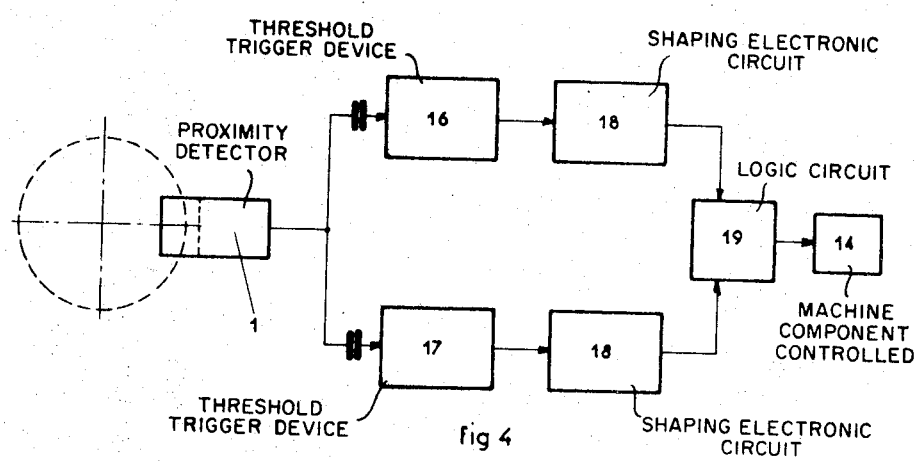
FIGS. 4, 5 and 6 are block diagrams of control systems each comprising a logic circuit.
Figure 7:
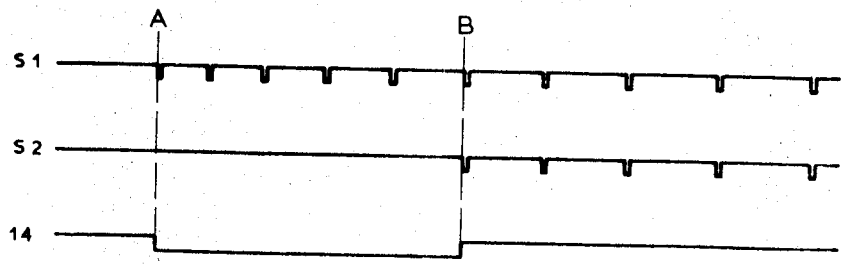
FIGS. 7, 8, 9 and 10 are schematic diagrams which correspond to said control systems.

These diagrams correspond to the following operating conditions:

FIGS. 4 and 7: Control of a machine component between two thresholds of speeds $V_1$ and $V_2$ during deceleration.

Figure 5:
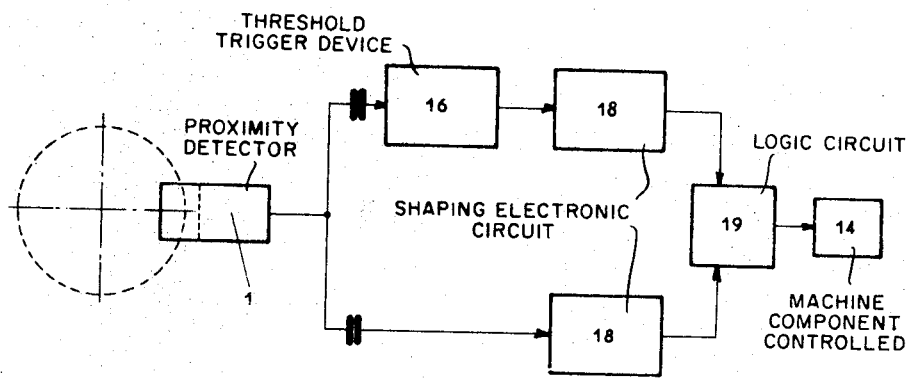
Figure 8:
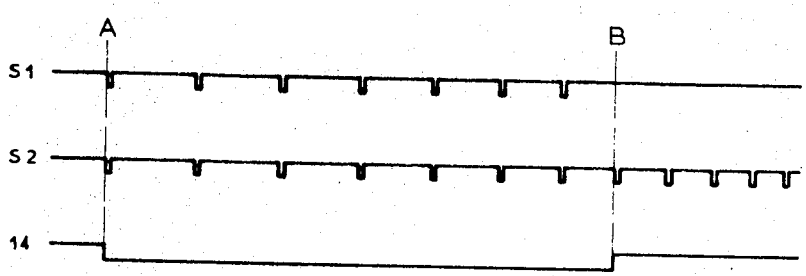

FIGS. 5 and 8: Control of a machine component between $V_{\#0}$ and $V_1$ during acceleration.

Figure 9:
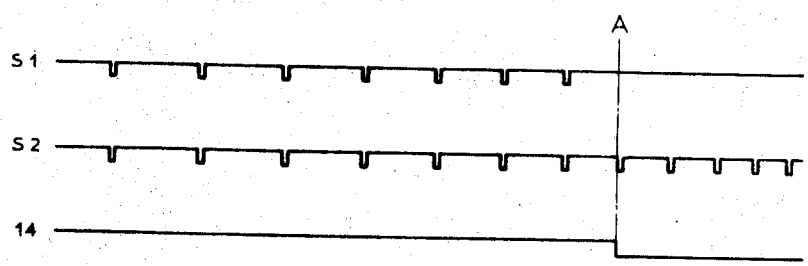

FIGS. 5 and 9: Control of a machine component starting from a speed $V_1$ during acceleration.

Figure 6:
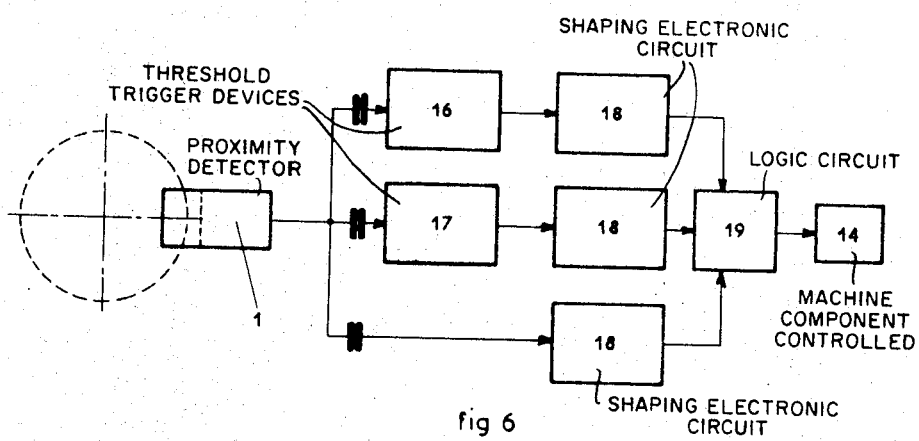
Figure 10:
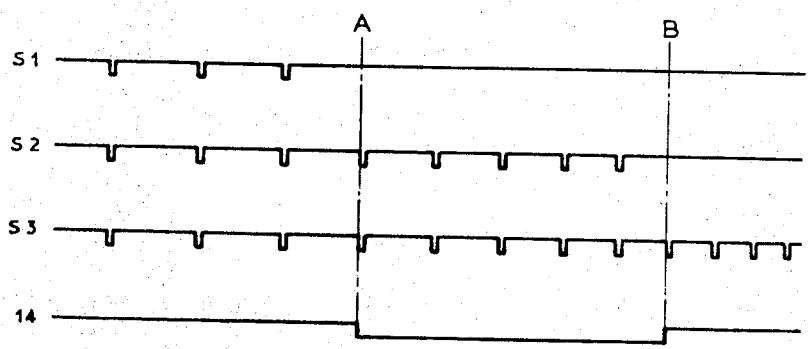

FIGS. 6 and 10: Control of a machine component between two thresholds of speeds $V_1$ and $V_2$ during acceleration.

It will first be pointed out that, in the example herein described which corresponds to the first three figures, a scraper must be applied against the rotary pasting disc at the end of deceleration of the machine at an instant such that the rod of cut tobacco has travelled over a distance comprised between X—which is the minimum length of arc of the disc which has to be cleaned, taking into account the position of the scraper relative to the point of application of adhesive to the paper strip by the rotary disc so that the wrapping paper is not glued to the disc when the machine is restarted—and X+Y, wherein Y is the distance between the point at which paste is applied to the paper by the rotary disc and the inlet of the guide in which the tobacco rod is formed. This second condition corresponds to the fact that the length of unsealed rod must not be increased in a machine which is provided with the device according to the invention with respect to a machine which is not fitted with a scraper.

Calculations show that, if X=100 mm. and Y=80 mm., the operation of the scraper must be initiated when the speed has dropped substantially to $V_0/5$.

Figure 1:
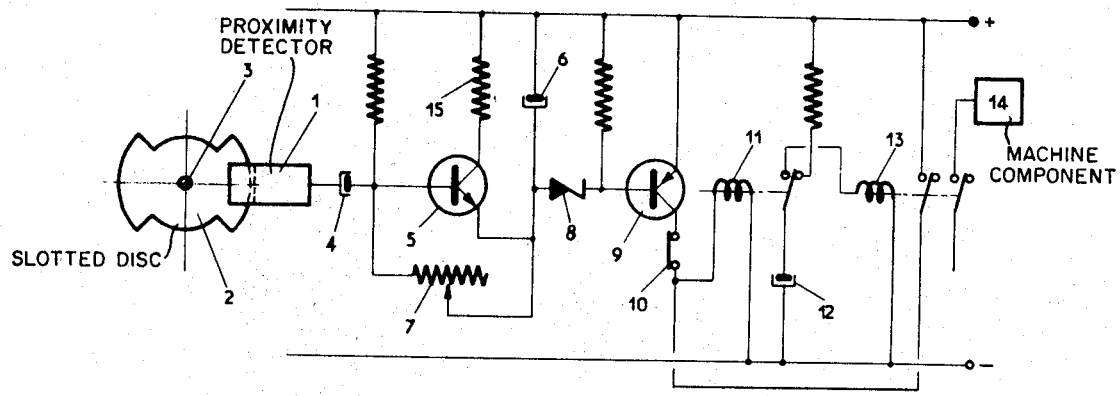
FIG. 1 is an electromechanical diagram of the device according to the invention which is designed to operate at a given speed during deceleration of the machine and after stoppage of this latter over a given period of time.

Referring now to FIG. 1, the device according to the invention which makes it possible to produce action under the conditions noted in the foregoing comprises a proximity detector 1 which is energized periodically by the vanes of a slotted disc 2 which is adapted to rotate about the shaft 3 at the same speed as the machine. Said detector 1 is coupled to an electronic discriminator which comprises a capacitor 4 connected to the base of an n-p-n transistor 5, an integrator unit composed of a capacitor 6 and a variable resistor 7, different resistors including one resistor 15 having a low value of resistance, a Zener diode 8 connected to the base of a p-n-p transistor 9. The timing device which follows said transistor comprises a switch 10 which is connected to the transistor 9, a relay 11 and a capacitor 12 switched by said relay, a relay 13 which serves to control an electromagnet of the machine component 14 and to maintain the relay 11 in the self-excited state during the discharge of the capacitor 12.

The switch 10, which is intended to permit the operation of the device only when the machine slows down, is closed only when the contactor which operates the general control units of the machine is in the rest position, thus preventing the electromagnet of the machine component 14 from being energized during the period of acceleration of the machine.

Figure 2:
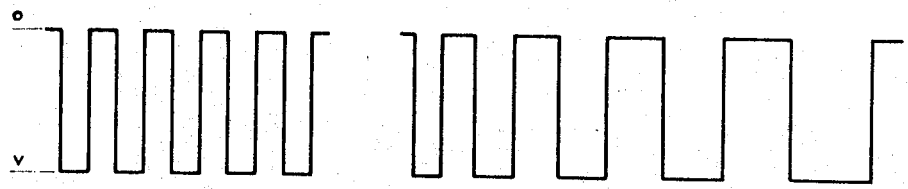
FIG. 2 represents the sequence of negative square-wave signals which are transmitted by the proximity detector.

The operation of the device is as follows:

When the disc 2 is rotating, the detector 1 transmits a sequence of negative square-wave signals (as shown in FIG. 2), the amplitude V of which remains constant but the frequency and consequently the period of which are dependent on the speed of rotation of the disc. These signals are transmitted by the capacitor 4 to the integrating circuit 6, 7.

As each signal is delivered, the capacitor 6 is charged to a value $$u \# \frac{1}{K} \int V . dt$$

(wherein K is the time constant resulting from the product of the values of the elements of the integrating circuit); the above value is dependent on the time $t$ during which the negative signal remains applied. During the charge of the capacitor 6, the base of the transistor 5 is accordingly maintained at a highly negative potential and said transistor remains blocked.

Figure 3:
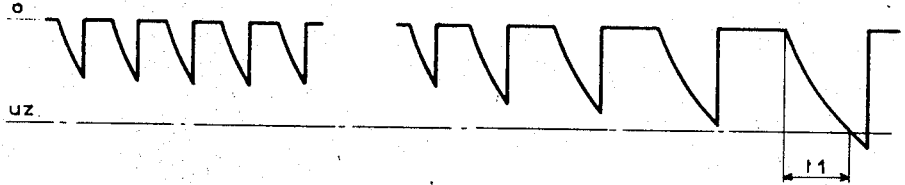
FIG. 3 represents the sequence of signals which are collected at the terminals of the capacitor which is included in the electronic discriminator of the threshold detector.

At the end of the signal, blocking conditions are no longer fulfilled, the transistor 5 becomes conductive and the capacitor 6 is rapidly discharged through said transistor and through the low-resistance resistor 15. There is therefore collected at the terminals of the capacitor 6 a negative signal having a wave-form as shown in FIG. 3.

When the machine slows down over a time interval $t=t_1$ of the integration time corresponding to a well-defined speed of the forming machine, the voltage $u$ attains the value $u_z$ of the diode 8 which becomes conductive: the transistor 9 also becomes conductive and the relay 11 which is energized accordingly closes. The capacitor 12 which was previously charged through a resistor then discharges through the coil of the relay 13 which also closes. One of the contacts of the relay 13 maintains the relay 11 in the self-excited state and another contact controls the electromagnet of the machine component 14. Said electromagnet remains energized until the voltage developed across the terminals of the capacitor 12 becomes insufficient to maintain the relay 13 closed.

It is clearly apparent that the sensitivity of the device may be enhanced by increasing the number of vanes of the slotted disc.

Since the resistor 7 is variable, the speed at which the machine component is controlled can be selected with a high degree of precision. Moreover, it is possible by selecting the capacitance rating of the capacitor 12 to reduce to a zero value the time during which the machine component will be controlled prior to or after complete stoppage of the machine. It is understood that, should it be found desirable to stop the control of the component before the machine comes to a standstill, it will accordingly be found necessary to couple the capacitor circuit to the threshold detector circuit. To this end, provision can be made for a switch which produces action within a short time interval after the passage of the initial pulses from the transistor 9 to the relay 11.

In order to increase the degree of precision obtained, the relays 11 and 13 of the timing device can be replaced by transistorized logic circuits, the response times of which are considerably shorter than those of relays.

FIG. 4 shows a system in which two threshold detectors 16 and 17 which are mounted in parallel receive pulses from a same proximity detector 1. The threshold detectors are set to trip at values $S_1$ and $S_2$ respectively so as to correspond to the two speeds $V_1$ and $V_2$ of the machine between which the machine component is to be controlled. The transmitted pulses which are amplified and shaped in the circuits 18 are delivered through suitable connections to a single logic circuit 19 which controls the electromagnet of the machine component 14. Pulses $S_1$ appear when the speed of the machine becomes lower than $V_1$. Pulses $S_2$ appear when the speed of the machine becomes lower than $V_2$.

The equation of the function which is performed by said logic circuit is written: $14 = S_1 \cdot \overline{S_2} + 14 \cdot \overline{S_1 \cdot S_2}$. As shown in the diagram of FIG. 7, the control of the machine component 14 is obtained at A when the initial signal $S_1$ appears and ceases at B when the initial signal $S_2$ appears.

In the case of FIG. 5 which is concerned with the operation of the device between $V_{\neq 0}$ and $V_1$ during the acceleration stage, provision has been made for a single threshold detector 16, the logic circuit 19 being coupled both to said detector, so as to permit the transmission of pulses from the time of start-up of the machine until the amplitude of said pulses is smaller than that which corresponds to $V_1$, and directly to the proximity detector 1 which delivers continuous pulses having the same frequency. It is understood that these pulses are amplified and shaped prior to reaching the logic circuit.

The function performed by said logic circuit corresponds to the equation:

$$14 = S_1 + 14 \cdot \overline{S_2 \cdot \overline{S_1}}$$

As shown in the diagram of FIG. 8, the control operation is performed from the instant of the initial pulse $S_1$ until the instant of the initial pulse $S_2$ which is not accompanied by the pulse $S_1$.

Should it be required to delay the initial operation of the device until after start-up of the machine so that said device should come into operation during acceleration, the same system will be employed and the logic circuit 19 will perform in this instance the function $$14 = \overline{S_1} \cdot S_2 + 14$$

as shown in the diagram of FIG. 9. The machine component is actuated at A when the pulse $S_2$ is received and not the pulse $S_1$; said component remains in operation as long as a cut-off device such as a switch or time-delay relay has not come into operation.

The system will comprise an additional detection stage which it is necessary to control during acceleration between two speed-threshold values $V_1$ and $V_2$. This system is shown in FIG. 6 with two threshold detectors 16 and 17 interposed in parallel together with their amplifying and shaping elements between the detector 1 and the logic circuit 19 to which continuous pulses $S_3$ derived from the detector 1 are also applied directly after amplification and shaping. The detectors 16 and 17 transmit pulses until the machine has reached the speeds $V_1$ and $V_2$ respectively. At start-up, pulses $S_4$ are received when the speed of the machine is lower than $V_1$, pulses $S_2$ being received when the speed is lower than $V_2$. By means of this assembly, the machine component will be controlled at A if the pulse $S_2$ and not the pulse $S_1$ is received up to B, whereupon the pulse $S_3$ is received and not the pulse $S_2$. The logic circuit 19 performs in this case the function corresponding to the equation $14 = \overline{S_1} \cdot S_2 + 14 \cdot \overline{S_3} \cdot \overline{S_2}$.

What I claim is:

1. A device for controlling a machine component during a variation in speed of a moving system, said device comprising a shaft, said shaft having an axis, said shaft rotating at a speed which is a function of the speed of said moving system, at least one adjustable threshold trigger device, an output relay device comprising a transistorized logic circuit, and a rectangular pulse emitting device having a rotating part, said part having an axis, said axis of said part being coupled with said axis of said shaft and the output of said emitting device being connected to the input of said trigger device.

2. A device for controlling a machine component during a variation in speed of a moving system comprising a shaft rotating at a speed which is a function of the speed of said moving system, a proximity detector delivering at least one pulse once per revolution of said shaft, two threshold trigger devices, which are set to trip as a result of the application of pulses having given amplitudes corresponding to two speeds of the moving system and a logic circuit which receives pulses from said trigger devices and which transmits pulses for the successive initiation of starting and stopping of said machine component.

3. A device for controlling a machine component during a variation in speed of a moving system comprising a shaft rotating at a speed which is a function of the speed of said moving system, a proximity detector delivering at least one pulse once per revolution of said shaft, one threshold device which is set to trip as a result of the application of pulses having a given amplitude corresponding to a predetermined speed of said moving system and which is energized by said proximity detector for controlling said machine component and a logic circuit which receives pulses directly from said proximity detector and from said threshold trigger device and which transmits pulses for controlling said machine component during acceleration of said moving system, from the time of start-up of said moving system and up to the desired speed and from the desired speed and for a period of time corresponding to the time of operation of a timing device.

4. A device according to claim 2, said logic circuit further receiving pulses directly from said proximity detector.

References Cited

UNITED STATES PATENTS

| | | | |
|---|---|---|---|
| 2,762,464 | 9/1956 | Wilcox | 317—5 XR |
| 2,941,120 | 6/1960 | Harman et al. | 317—5 |
| 3,197,658 | 7/1965 | Byrnes et al. | 307—116 |
| 3,351,811 | 11/1967 | Buckley et al. | 317—5 |
| 3,365,614 | 1/1968 | Luongo et al. | 317—5 |
| 3,365,615 | 1/1968 | Bart | 317—5 |
| 3,417,289 | 12/1968 | Jensen | 317—5 |
| 3,447,034 | 5/1969 | Smith | 317—5 |

FOREIGN PATENTS 490,297 2/1953 Canada.

WILLIAM M. SHOOP, JR., Primary Examiner

U.S. Cl. X.R.

307—121